Oct. 30, 1951 M. M. GRUBER 2,573,011

PLURAL MOTOR TURNTABLE DRIVE

Filed Nov. 29, 1946 2 SHEETS—SHEET 1

INVENTOR
MORRIS M. GRUBER
BY James and Franklin
ATTORNEYS

PLURAL MOTOR TURNTABLE DRIVE

Filed Nov. 29, 1946

INVENTOR
MORRIS M. GRUBER
BY James and Franklin
ATTORNEYS

Patented Oct. 30, 1951

2,573,011

UNITED STATES PATENT OFFICE 2,573,011

PLURAL MOTOR TURNTABLE DRIVE

Morris M. Gruber, New York, N. Y., assignor to Presto Recording Corporation, New York, N. Y., a corporation of New York Application November 29, 1946, Serial No. 713,161

14 Claims. (Cl. 172—36)

This invention relates to phonograph turntables, and more particularly to such turntables intended to carry both regular speed and slow speed records.

For professional and broadcasting purposes slow speed recordings are often used, these being turned at 33⅓ R. P. M. A single 16" record turned at this slow speed may be used for a complete fifteen minute recording. At other times it may be desired to use the same equipment for ordinary records played at the standard speed of approximately 78 R. P. M. For this purpose, it has already been proposed to use speed changers permitting a motor to drive the turntable at either of the two speeds. Some of these employ different diameter rubber pulleys which bear frictionally against the rim of the turntable. Such a non-positive drive tends to become inadequate with the greater refinement of broadcasting today, and the trend toward high fidelity reproduction. Even a slight drift in speed causing a slight change in pitch may become noticeable with high fidelity equipment. Moreover, in the case of a 16" slow speed record intended to play an entire 15 minute broadcast, any slight slippage leading to extension of the playing time by a small fraction of a minute may lead to an overtime penalty, or may result in cutting off part of a commercial at the end of the broadcast.

Other drives with gear shifting arrangements have been attempted, but none has proved wholly satisfactory, and all have introduced difficulties.

The primary object of the present invention is to overcome such difficulties, and to generally improve multiple speed turntable drives. A more specific object is to provide a drive in which the turntable is positively driven by synchronous motors, thereby ensuring accurate speed, there being two such motors, either of which may be operated by changing a switch controlling the energization of the motors. Other objects of my invention are to provide a compact, sturdy, mechanical arrangement satisfactory for even the highest grade reproducing and recording equipment; to effectively prevent damage to the parts of the apparatus in the event that the turntable is manually spun faster than the motor drive, or in the event that both motors are operated at once; to ensure that end thrust or axial thrust is in desired direction; and to facilitate using synchronous motors which operate at the same speed.

To accomplish the foregoing objects, and other more specific objects which will hereinafter appear, my invention resides in the turntable drive elements and their relation one to the other, as are hereinafter more particularly described in the following specification. The specification is accompanied by drawings, in which.

Figure 1:
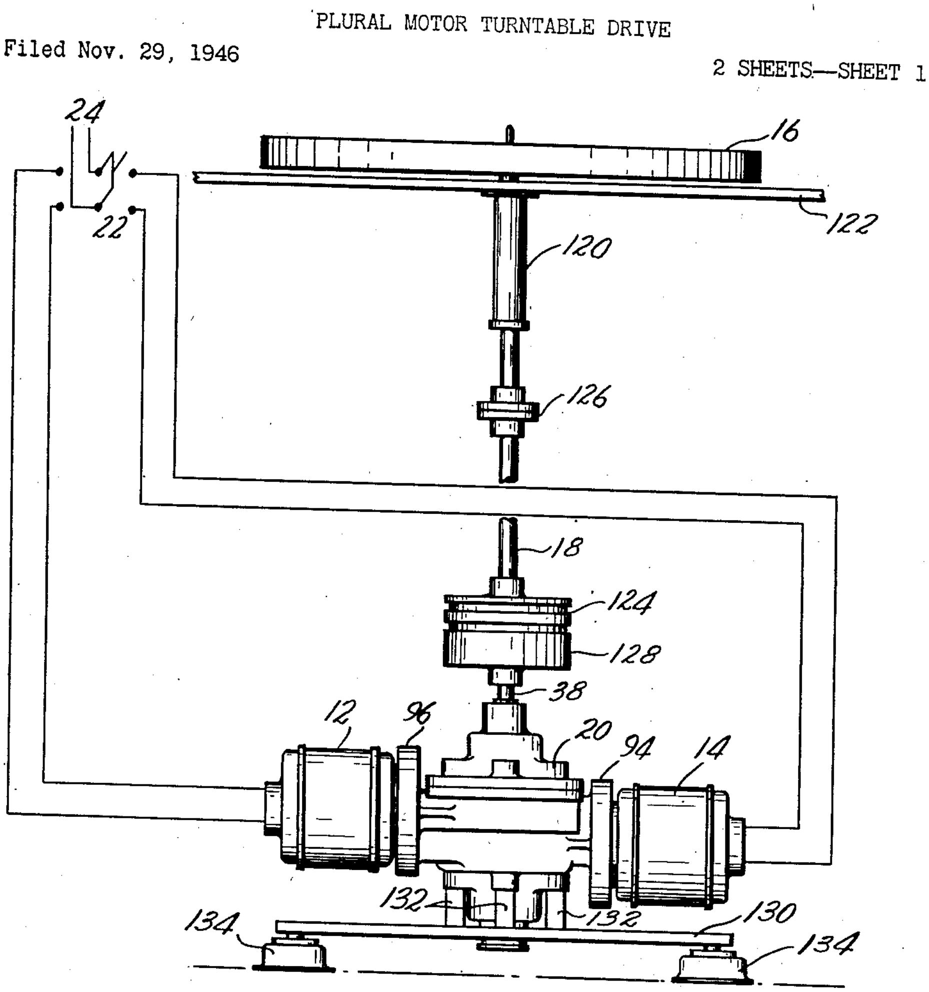
Fig. 1 is a side elevation of apparatus embodying features of my invention.

Referring to the drawing, and more particularly to Fig. 1, the two speed drive there illustrated comprises a first synchronous motor 12, and a second synchronous motor 14, each arranged to drive a turntable 16 through a turntable shaft 18, and a gear housing 20. The motors are energized through suitable switch means, here indicated as a double-pole, double-throw switch 22, the poles of which are connected at 24 to a suitable alternating current power line. It will be understood that by throwing the switch to the left, the motor 12 is energized, and by throwing the switch to the right, the motor 14 is energized. This provides an extremely simple way to drive the turntable at either of the two desired speeds, and while it might at first thought seem wasteful to employ two motors for this purpose, I have found that the simplification of the control structure, and the improved operation of the apparatus, thoroughly warrant the expense of the extra motor.

Figure 5:
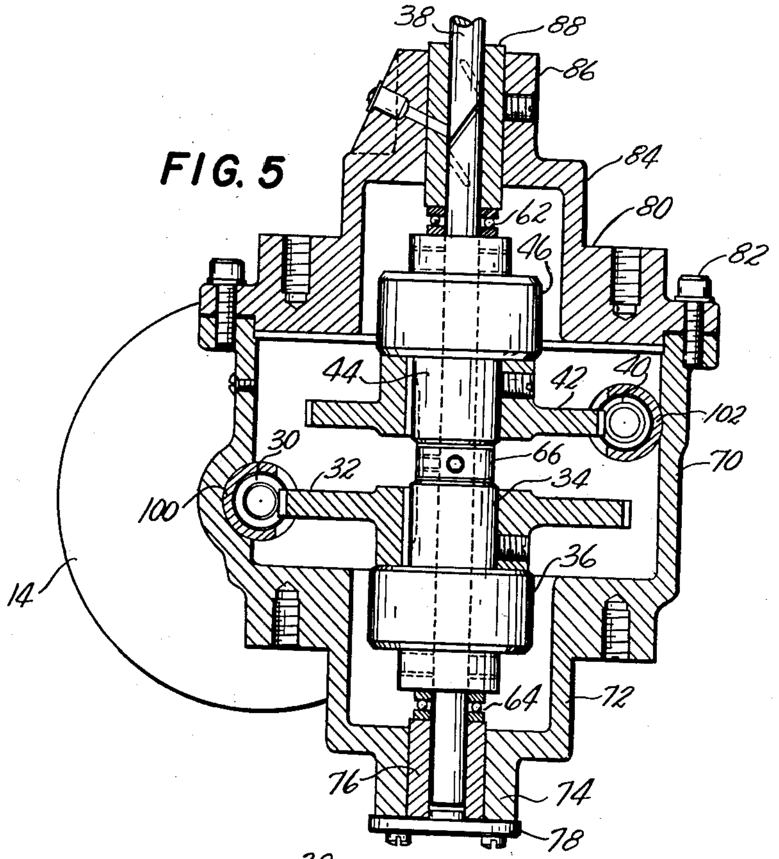
Fig. 5 is a vertical section through the gear housing taken approximately in the plane of the line 5—5 of Fig. 2.

Attention is now directed to Fig. 5 of the drawing, in which it will be seen that the motor 14 drives a worm 30 meshing with a worm gear 32 carried by the hub 34 of an over-running clutch 36. The latter is in turn connected to the vertical turntable shaft 38. Similarly, the motor 12 drives a worm 40 meshing with a worm gear 42 carried on the hub 44 of an over-running clutch 46, which in turn is connected to the turntable shaft 38. It will be understood that the over-running clutches permit the turntable to be rotated faster than the motors in record playing direction, that is, in clockwise direction looking down at the turntable. For this reason, when one of the motors is operated it turns the table without interference by the other motor which is stationary, for the clutch of the latter motor simply over-runs. An incidental advantage of this arrangement is that no harm can result if the operator spins the turntable forcibly by hand in an effort to accelerate the same, and another incidental advantage is that no harm results if through some highly unlikely error in electrical wiring, both motors were to be operated at once, for the high speed motor would take the drive, and the clutch of the lower speed motor would simply over-run.

In Fig. 5 it may be noted that for compactness and sturdiness of the gear housing and gear arrangement the worm gears 32 and 42 are disposed close to one another, and that the over-running clutches 36 and 46 are disposed outside the gears, that is, pointing away from one another. For this reason, the clutches are not actually alike, although they are similar in construction, one, in this case the clutch 36, being a right-hand clutch, and the other being a left-hand clutch. The result is that both over-run when the turntable is spun by hand in clockwise direction.

Figure 3:
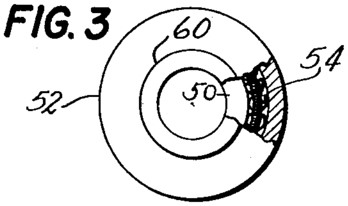
Fig. 3 is a partially sectioned view of an overrunning clutch forming part of the apparatus.
Figure 4:
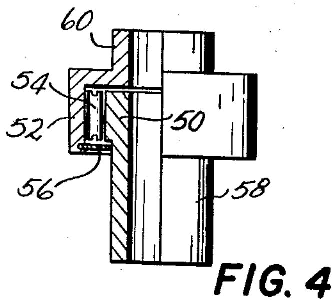
Fig. 4 is a partially sectioned elevation of the clutch.

The over-running clutches may be of any standard type, but I prefer to use a clutch of the character shown in Figs. 3 and 4 of the drawing, this being a device sold under the commercial name "Formsprag over-running clutch," made by the Gear Grinding Company of Detroit, Michigan. Referring to Figs. 3 and 4 of the drawing, it will be seen that the clutch comprises an inner race 50 and an outer race 52, with tiltable wedges or so-called "sprags" 54 therebetween. In assembling the clutch, the parts are held together by a retainer ring 56 snapped into position in a groove in the outer race. It will be evident that this clutch is better adapted to take end thrust or axial thrust upward, as viewed in Fig. 4, than downward.

In accordance with the present invention, the worm gear is mounted on the outside of sleeve 58 of the clutch, while the turntable shaft is secured inside the hub 60.

Reverting now to Fig. 5 of the drawing, it will be seen that clutch 36 is preferably subjected to a downward thrust, and that clutch 46 is preferably subjected to an upward thrust. To provide this, the worms are threaded in opposite directions, specifically, the worm 40 is a right-hand worm and is turned by motor 12 which is a clockwise motor, while the worm 30 is a left-hand worm and is turned by motor 14 which is a counter-clockwise motor. When motor 12 is operated, the upward thrust is applied to a top thrust bearing 62, and when motor 14 is operated the downward thrust is applied to a bottom thrust bearing 64. In neither case is thrust applied to collar 66, this acting merely as a spacer between the worm gears.

The synchronous motors may be differently wound to help provide the desired difference in driving speed for the turntable, but I prefer to use synchronous motors which operate at a common speed. The difference in turntable speed is made up in the gearing, and for this purpose at least one of the worms is a multiple threaded worm having twice as many threads as the other. In the specific structure here illustrated, both worms are multiple thread worms, the worm 40 having four threads, and the worm 30 having two threads. A further difference in speed is made up by a difference in diameter or in number of teeth on the worm gears 32 and 42, it being noted in Fig. 5 that worm gear 42 is somewhat smaller in diameter than worm gear 32. The net result is to drive the turntable at either 33⅓ R. P. M. or at 78.26 R. P. M., in the particular machine here illustrated.

The nature of the gear housing will be clear from study of the drawings. The gear housing is preferably fully enclosed as shown, and filled with oil, so that the parts will operate in a bath of oil. The main part of the housing is a generally cylindrical body 70 (Fig. 5) stepped to a reduced portion 72 for the clutch 36, and terminating in a bearing 74 having a bearing sleeve 76 held in position by a bottom cap or plate 78. The housing is closed at the top by a cap 80 held in position by screws 82 and having a reduced portion 84 for receiving clutch 46. The cap terminates in a bearing 86 having a bearing sleeve 88.

Figure 2:
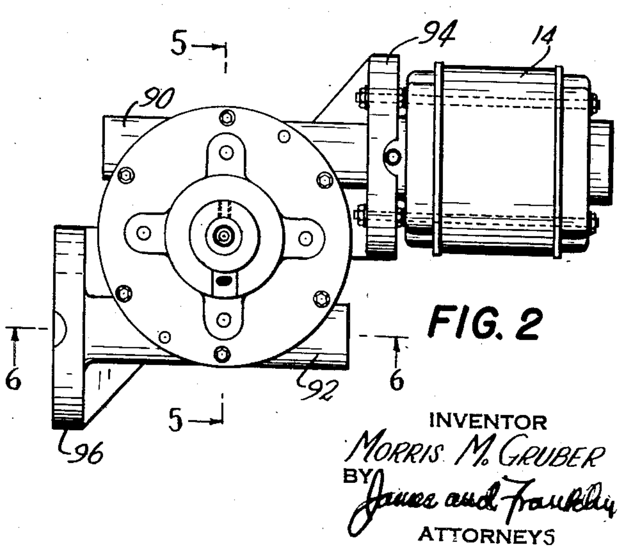
Fig. 2 is a plan view of the gear housing.
Figure 6:
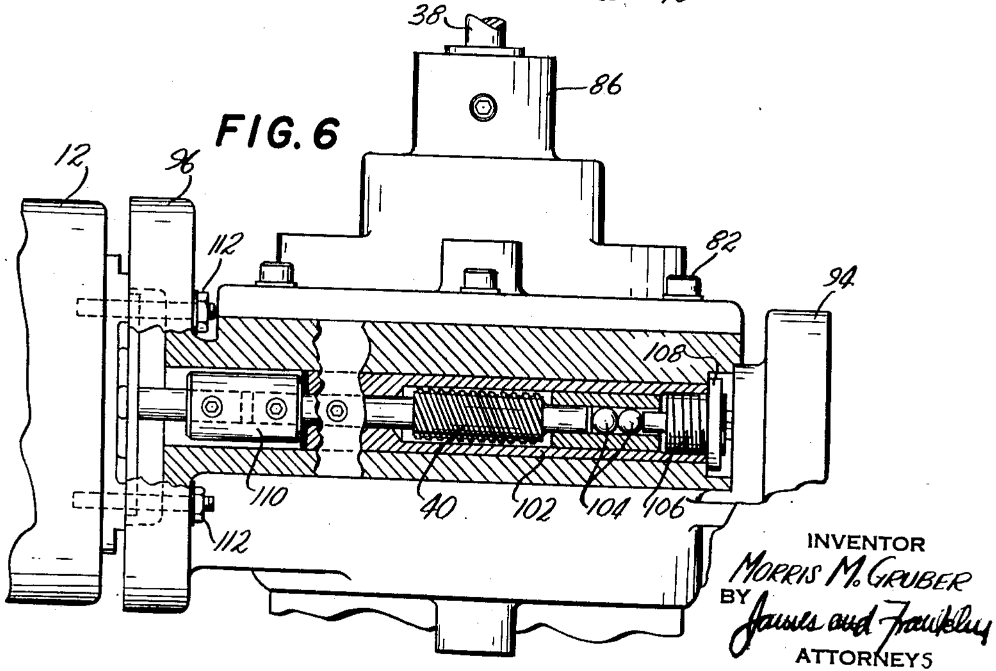
Fig. 6 is a partially sectioned elevation taken approximately in the plane of the line 6—6 of Fig. 2.

Fig. 2 shows the body portion of the casting, with its horizontal cylindrical chambers 90 and 92, terminating in flanges 94 and 96 to which the motors are bolted, as is best shown in Figs. 2 and 6. In these figures one motor has been omitted to save space. In Figs. 5 and 6 it will be seen how the worms rotate in protective sleeves 100 and 102, these sleeves being received in the cylindrical portions of the casting previously described as is best shown in Fig. 6.

In Fig. 6 it will be seen how the end thrust of the worm 40 is taken by large balls 104, which in turn are held by a threaded adjustable plug 106, the adjustment of which may in turn be locked by means of suitable internally threaded lock nut 108. At its opposite end the worm shaft passes through a bearing in the sleeve 102, and is connected to the shaft of the motor by means of a suitable coupling 110. The motor itself is bolted to the flange 96 by means of mounting bolts 112.

Reverting to Fig. 1, in the particular equipment here illustrated the turntable 16 has a shaft carried in a main bearing 120 depending from a plate 122 at the top of the unit. The switch 22 is, of course, preferably made accessible on top of plate 122 near the turntable. The shaft 38 of the drive unit is preferably connected to the turntable shaft through flexible couplings 124 and 126. A mechanical filter 128 is also preferably employed between shaft 38 and the turntable 16, this mechanical filter functioning to eliminate both vibration in a vertical direction, and flutter in a rotation direction.

The gear housing is supported on a bed plate 130 by means of blocks 132, and the bed plate 130 is in turn supported on "shock-mounts" 134 resting on the bottom of the cabinet or the base of the complete unit.

It is believed that the construction and operation, as well as the advantages of my improved multiple speed turntable drive, will be apparent from the foregoing detailed description thereof. To operate the turntable at one speed or the other it is merely necessary to flip the control switch in one direction or the other. The double-pole, double-throw switch employed is preferably provided with a mid position in which power is cut off both motors, so that the switch may be used as a control switch as well as a speed-changing switch. The turntable is driven at uniform speed because of the positive nature of the drive, the over-running clutch being so designed that it takes hold and locks almost instantly, and is positive in its drive once it locks. Because of the over-running clutches either motor may drive the turntable without interference by the other. If when starting up the operator impatiently spins the turntable to help it come up to speed, no harm can result, for it simply over-runs or coasts. If through some accident both motors are energized at once, no injury is caused, for the faster drive will govern and the other clutch will simply over-run. End thrust is applied to the clutches and to the thrust bearings in preferred direction, and the desired operating speeds may be obtained without a difference in motor speed. The gear arrangement is compact, with the motors differing very little in elevation.

It will be understood that while I have mentioned the two speeds at 33⅓ and 78.26 R. P. M., these speeds may be different, should there be a change in conventional recording practice. Moreover, while I have shown two speeds, the invention is applicable to a multiple speed drive having more than two speeds, it being necessary to add merely a third motor, worm, worm gear and clutch for a third speed, and so on. This is of no immediate importance, but may prove important in the event of the adoption of still another standard recording speed. Separate switches may be used for the motors, although a common switch has the advantage of making sure that one motor is idle when the other is energized. Different speed motors may be used to achieve the desired difference in turntable speed, instead of procuring that difference by a change in gear ratio, or if convenient, a combination of both a change in motor speed and a change in gear ratio may be employed. For example, when using one motor having a speed twice the other, the additional difference in turntable speed may be made up in the gear ratio.

It will therefore be apparent that while I have shown and described my invention in a preferred form, changes may be made in the structure disclosed, without departing from the spirit of the invention as sought to be defined in the following claims.

I claim:

1. In combination, a phonograph type turntable, a first synchronous driving motor and means coupling the same to the turntable for driving the table at one desired uniform speed, a second synchronous driving motor and means coupling the same to the turntable for driving the table at a second desired uniform speed, said motors being A. C. motors of the synchronous type adapted to be connected to and operated in strict synchronism with a standard A. C. supply, said first and second coupling means each including an over-running clutch permitting either motor to drive the turntable with the other motor idle, a power source for said motors, and a switch means to energize one motor or the other.

2. In combination, a phonograph type turntable, a first synchronous driving motor and means coupling the same to the turntable for driving the table at a uniform speed at substantially 78 R. P. M., a second synchronous driving motor and means coupling the same to the turntable for driving the table at a uniform speed at substantially 33⅓ R. P. M., said motors being A. C. motors of the synchronous type adapted to be connected to and operated in strict synchronism with a standard A. C. supply, said first and second coupling means each including an over-running clutch permitting either motor to drive the turntable with the other motor idle, a power source for said motors, and a switch to selectively energize one motor or the other but not both.

3. In combination, a phonograph type turntable, a first synchronous driving motor and a first set of positive gearing for driving the table with minimum speed fluctuation at one desired speed, a second synchronous driving motor and a second set of positive gearing for driving the table with minimum speed fluctuation at a second desired speed, said motors being A. C. motors of the synchronous type adapted to be connected to and operated in strict synchronism with a standard A. C. supply, said first and second drives each including an over-running clutch permitting either motor to drive the turntable with the other motor idle, a power source for said motors, and switch means to energize one motor or the other.

4. In combination, a phonograph type turntable, a first synchronous driving motor and a first set of positive gearing for driving the table with minimum speed fluctuation at substantially 78 R. P. M., a second synchronous driving motor and a second set of positive gearing for driving the table with minimum speed fluctuation at substantially 33⅓ R. P. M., said motors being A. C. motors of the synchronous type adapted to be connected to and operated in strict synchronism with a standard A. C. supply, said first and second drives each including an over-running clutch permitting either motor to drive the turntable with the other motor idle, a power source for said motors, and a switch to selectively energize one motor or the other but not both.

5. In combination, a phonograph type turntable, a first synchronous driving motor and a first worm and worm gear for driving said table with minimum speed fluctuation at one desired speed, a second synchronous driving motor and a second worm and worm gear for driving the table with minimum speed fluctuation at a second desired speed, said motors being A. C. motors of the synchronous type adapted to be connected to and operated in strict synchronism with a standard A. C. supply, an over-running clutch between the first worm gear and the turntable shaft, a second over-running clutch between the second worm gear and the turntable shaft, said clutches permitting either motor to drive the turntable with the other motor idle, a power source for said motors, and switch means to energize one motor or the other.

6. In combination, a phonograph type turntable, a first synchronous driving motor and a first worm and worm gear for driving said table with minimum speed fluctuation at substantially 78 R. P. M., a second synchronous driving motor and a second worm and worm gear for driving the table with minimum speed fluctuation at substantially 33⅓ R. P. M., said motors being A. C. motors of the synchronous type adapted to be connected to and operated in strict synchronism with a standard A. C. supply, an over-running clutch between the first worm gear and the turntable, a second over-running clutch between the second worm gear and the turntable, a power source for said motors, and a switch to selectively energize one motor or the other but not both.

7. In combination, a phonograph type turntable, a first synchronous driving motor and a first worm and worm gear for driving said table at one desired speed, a second synchronous driving motor and a second worm and worm gear for driving the table at a second desired speed, an over-running clutch between the first worm gear and the turntable, a second over-running clutch between the second worm gear and the turntable, at least one of said worms being a multiple thread worm, and one of said worms having twice as many threads as the other.

8. In combination, a phonograph type turntable, a first synchronous driving motor and a first worm and worm gear for driving said table at substantially 78 R. P. M., a second synchronous driving motor and a second worm and worm gear for driving said table at substantially 33⅓ R. P. M., an over-running clutch between the first worm gear and the turntable, a second over-running clutch between the second worm gear and the turntable, said motors operating at the same speed, one of said worms having twice as many threads as the other, and said worm gears differing somewhat in number of teeth to help produce the desired two speeds.

9. In combination, a phonograph type turntable, a first synchronous driving motor and a first worm and worm gear for driving said table at substantially 78 R. P. M., a second synchroous driving motor and a second worm and worm gear for driving the table at substantially 33⅓ R. P. M., an over-running clutch between the first worm gear and the turntable, a second over-running clutch between the second worm gear and the turntable, said motors operating at the same speed, one of said worms having twice as many threads as the other, said worm gears differing somewhat in number of teeth to help produce the desired two speeds, a power source for said motors, and a switch to selectively energize one motor or the other.

10. In combination, a phonograph type turntable, a first synchronous driving motor and a first worm and worm gear for driving said table at one desired speed, a second synchronous driving motor and a second worm and worm gear for driving the table at a second desired speed, an over-running clutch between the first worm gear and the turntable, a second over-running clutch between the second worm gear and the turntable, one of said worms being a right-hand and the other a left-hand worm, and one of said motors turning clockwise and the other turning counterclockwise, whereby both motors turn the turntable in the same direction but their axial thrusts are in opposite directions.

11. In combination, a phonograph type turntable, a first synchronous driving motor and a first worm and worm gear for driving said table at substantially 78 R. P. M., a second synchronous driving motor and a second worm and worm gear for driving the table at substantially 33⅓ R. P. M., an over-running clutch between the first worm gear and the turntable, a second over-running clutch between the second worm gear and the turntable, one of said worms being a right-hand and the other a left-hand worm, one of said motors turning clockwise and the other turning counterclockwise, whereby both motors turn the turntable in the same direction but their axial thrusts are in opposite directions, a power source for said motors, and a switch to selectively energize one motor or the other.

12. In combination, a phonograph type turntable, a first synchronous driving motor and a first worm and worm gear for driving said table at substantially 78 R. P. M., a second synchronous driving motor and a second worm and worm gear for driving the table at substantially 33⅓ R. P. M., an over-running clutch between the first worm gear and the turntable, a second over-running clutch between the second worm gear and the turntable, said motors operating at the same speed, one of said worms having twice as many threads as the other, said worm gears differing in number of teeth to help produce the desired two speeds, one of said worms being a right-hand and the other a left-hand worm, and one of said motors turning clockwise and the other turning counterclockwise, whereby both motors turn the turntable in the same direction but their axial thrusts are in opposite directions.

13. In combination, a phonograph type turntable, a first synchronous driving motor and a first worm and worm gear for driving said table at one desired speed, a second synchronous driving motor and a second worm and worm gear for driving the table at a second desired speed, an over-running clutch between the first worm gear and the turntable, a second over-running clutch between the second worm gear and the turntable, said worm gears being disposed relatively closely together with their hubs in opposite directions away from each other, said over-running clutches being similarly relatively inverted with like races secured to said hubs, and one of said clutches being a right-hand and the other a left-hand clutch, whereby both permit over-running of the turntable in the same direction.

14. In combination, a phonograph type turntable, a first synchronous driving motor and a first worm and worm gear for driving said table at substantially 78 R. P. M., a second synchronous driving motor and a second worm and worm gear for driving the table at substantially 33⅓ R. P. M., an over-running clutch between the first worm gear and the turntable, a second over-running clutch between the second worm gear and the turntable, said worm gears being disposed relatively closely together with their hubs in opposite directions away from each other, said over-running clutches being similarly relatively inverted with like races secured to said hubs, and one of said clutches being a right-hand and the other a left-hand clutch, whereby both permit over-running of the turntable in the same direction, a source of power for said motors, and a switch for selectively energizing one motor or the other.

MORRIS M. GRUBER.

REFERENCES CITED

The following references are of record in the file of this patent:

UNITED STATES PATENTS

| Number | Name | Date |
|---|---|---|
| 1,147,417 | Marburg | July 20, 1915 |
| 1,596,783 | Bishop | Aug. 17, 1926 |
| 1,996,579 | Johnstone, et al. | Apr. 2, 1935 |
| 2,006,172 | Klappauf | June 25, 1935 |
| 2,041,875 | Stoller | May 26, 1936 |
| 2,356,590 | Jacobsen | Aug. 22, 1944 |
| 2,424,989 | Koepfer | Aug. 5, 1947 |

FOREIGN PATENTS

| Number | Country | Date |
|---|---|---|
| 333,580 | Great Britain | of 1929 |
| 705,084 | France | Mar. 2, 1931 |